UNITED STATES PATENT OFFICE.

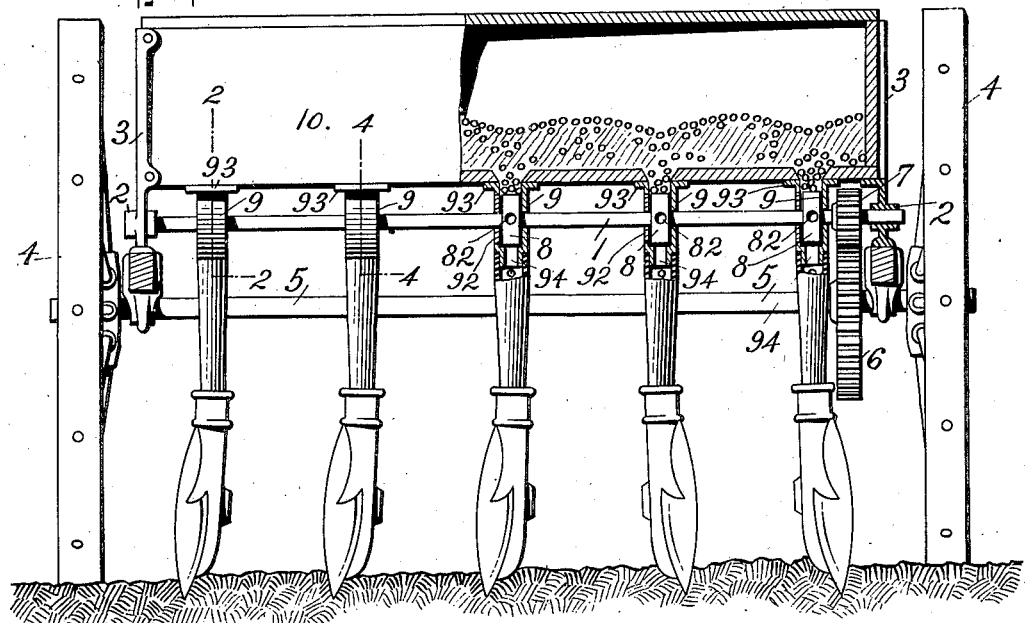
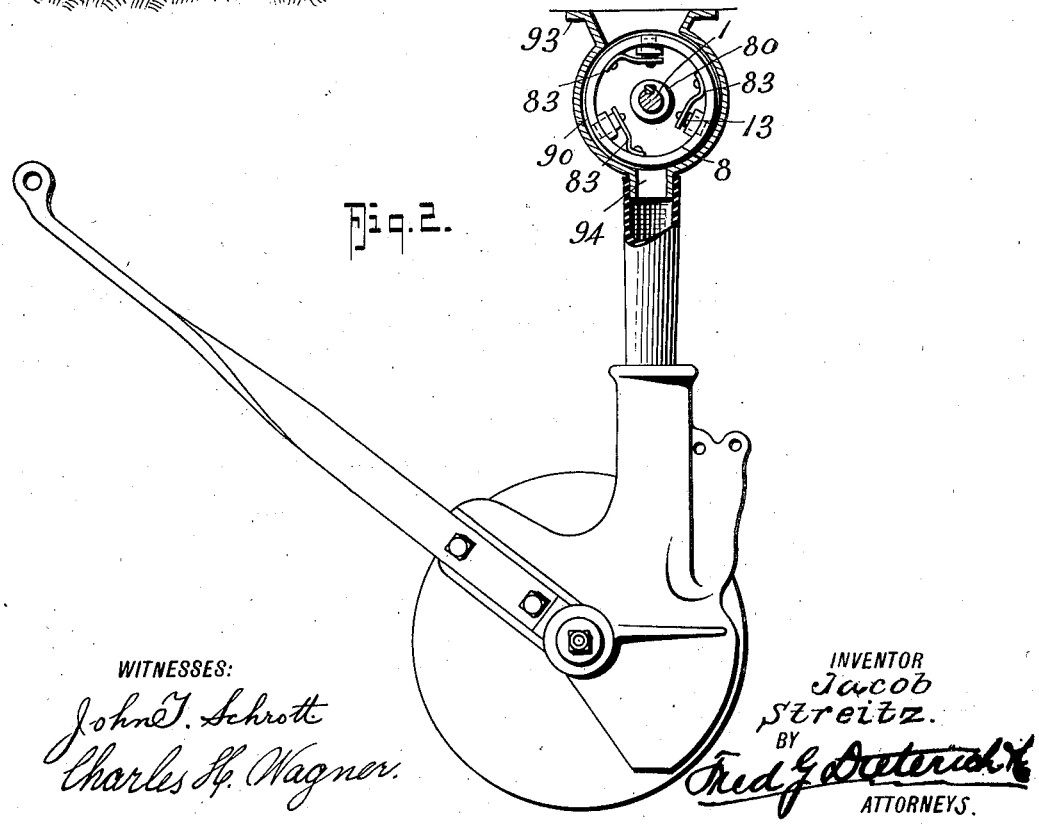

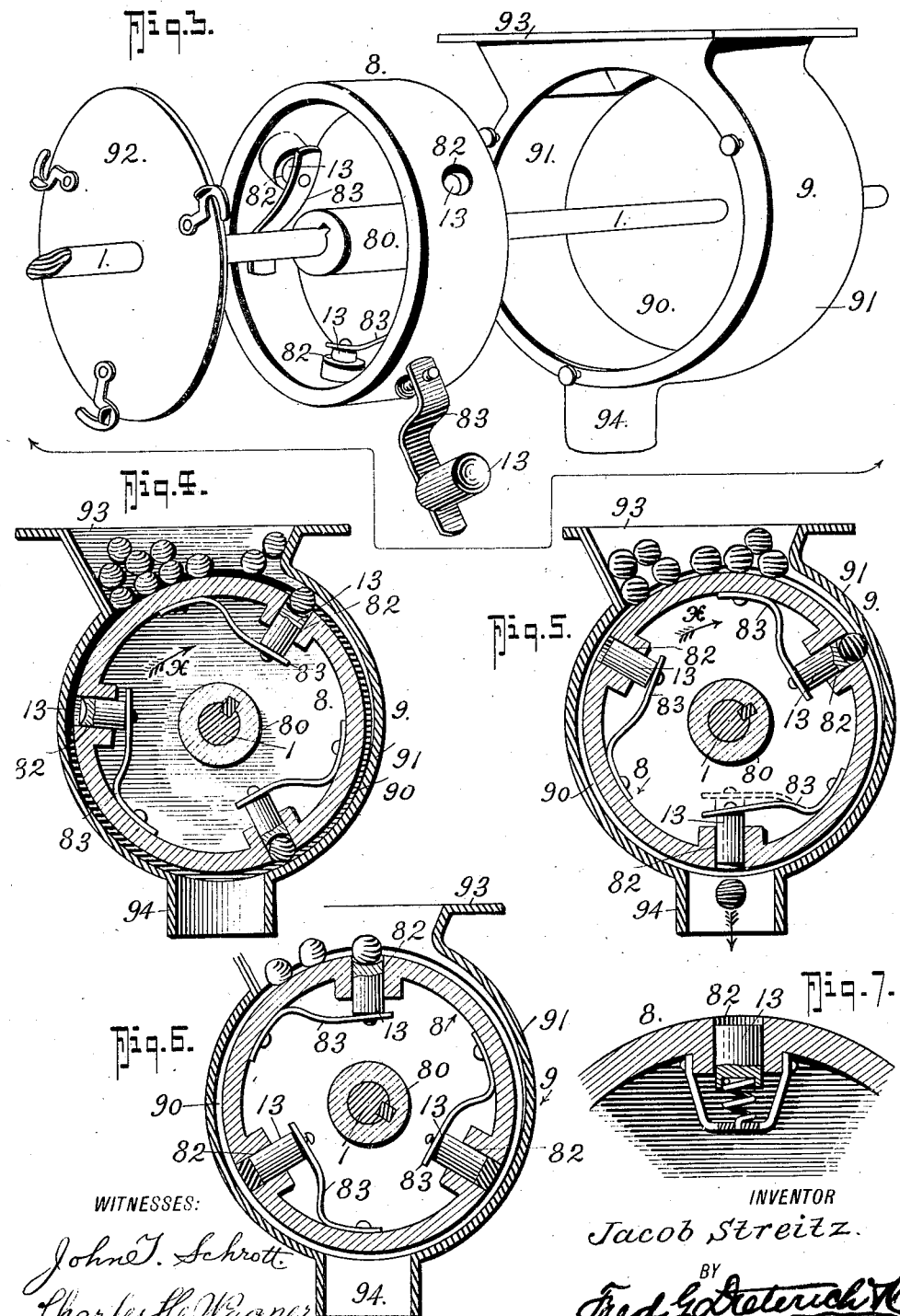

JACOB STREITZ, OF MARINE CITY, MICHIGAN.

SEED-DROPPING MECHANISM.

969,918.  Specification of Letters Patent.  Patented Sept. 13, 1910.

Application filed March 4, 1910. Serial No. 547,316.

*To all whom it may concern:*

Be it known that I, JACOB STREITZ, residing at Marine City, in the county of St. Clair and State of Michigan, have invented a new and Improved Seed-Dropping Mechanism, of which the following is a specification.

This invention relates to improvements in seeders and planters and more specifically to means for dropping the seed and it has for its object to provide a dropping mechanism of a simple and economical character, that can be readily applied to the ordinary types of planters and drills, and in which the seed gathering and dropping action is positive and uniform.

My invention in its generic nature, comprehends an improved arrangement of a single drive shaft for actuating all the dropper wheels or cups, and the peculiar manner in which the dropper or cup wheels are housed.

In its more specific nature, my invention embodies an improved construction of dropping wheel or cup, a casing therefor and a resilient receiver for each seed pocket, that serves to positively discharge the seed from the cup at predetermined times, and in its still more subordinate features, my invention consists in certain details of construction and novel arrangement of parts, all of which will be hereinafter fully explained, specifically pointed out in the appended claims and illustrated in the accompanying drawings, in which:—

Figure 1, is a rear elevation of a planter, a portion of the seed box and several of the dropper devices being shown in section to the better illustrate the correlation of the parts. Fig. 2, is a vertical section on the line 2—2 of Fig. 1 of one of the feed wheels or cups and the hopper casing therefor, the same being shown combined with a disk drill. Fig. 3, is a perspective view of the hopper casing for one of the seed dropper wheels or cups, the latter and the casing cap being shown as removed from the casing. Figs. 4 and 5 are central vertical sections on the line 4—4 of Fig. 1 of one of the seed dropper devices, and illustrate the manner in which the seed is conveyed from the hopper to the discharge. Fig. 6, is a similar view and illustrates the manner in which the dropper wheel cups are arranged to regulate the number of seed receiving cavities therein. Fig. 7, is a detail view of a slightly modified form of my invention hereinafter explained.

In the practical application of my invention, I arrange a separate and distinct housing or casing for each dropping device, but I mount all of the said devices on a single shaft so that they work in unison.

By now referring to Fig. 1, it will be noticed that operating shaft 1 is located under the seed box, extends the full length thereof and is journaled in end brackets 2—2 mounted on side beams 3—3 of the planter frame that includes the usual side wheels 4—4 and the axle 5. Power is transmitted from shaft 5 through the large gear 6 mounted thereon to the small gear 7 on the seed dropper shaft 1.

Since each of the seed dropping devices are of like construction, a full description of one set of such devices is deemed sufficient.

Referring now more particularly to Figs. 2 and 3 it will be seen the dropping means comprises a hollow or cup shaped wheel 8, one end of which has an inwardly extending hub 80 keyed on the shaft 1 to turn therewith, and to slide endwise thereon for the convenient assemblage of parts. Member 8 when set up for use, is located within a casing 9, one end 90 of which is integral with the sides 91 and the other end is a cap member 92 that is made fast by hooks and pins or otherwise, so it can be easily removed when it is desired to gain access to the dropping wheel. Casing 9, at the upper end, terminates in a widened mouth or hopper 93 flanged to be readily attached to the under side of the seed box 10, see Fig. 1. Opposite the hopper the casing has a discharging nozzle 94 that connects with the tube or boot portion of the drill devices, of any approved type, for example, as shown in Figs. 1 and 2.

In practice the dropping wheel moves in the direction indicated by arrows *x* and the said wheel has one or more radially disposed apertures that form the seed pockets 82 that collect the seed as they pass under the hopper portion of the casing, see Fig. 6. To provide for a positive discharge of the seed when it comes in line with the discharging nozzle 94, plungers 13 are mounted in the said pocket apertures 82 and the said plungers are secured on springs 83, preferably arranged as shown in Figs. 3, 4 and 5 or as shown in the modified arrangement in Fig.

7. The plungers 13 when at their normal position, are free of spring tension and their outer ends are held sufficiently back of the periphery of the wheel 8 to provide a shallow pocket for the seed to lodge in as the pockets pass through the hopper feed, the said outer ends being concaved to facilitate the lodgment of the seed thereon. By reason of holding the plungers practically free of spring tension when they receive the seed, reduces the frictional resistance on the seed as it is conveyed with the dropper wheel and it engages the downgoing side of the casing as in Fig. 4 and to facilitate the gradual application of spring tension to the plungers the passageway or space between the downgoing side of the casing and the corresponding face of the member 8 is tapering with the greatest width at the top and the least at the bottom. By reason of such arrangement of the parts stated, the seed is gradually forced back into the pocket and spring tension is gradually increased on the plungers so that when the seed in the pocket comes in line with the discharge the spring pressure will positively force it out of the said dropping member 8. Another advantage in constructing the dropping member 8 as shown and described is that each dropping device can be readily adjusted and one or more of the pocket apertures can be plugged as shown in Fig. 6 to increase the distance between the droppings, as described.

From the foregoing, taken in connection with the drawings, the complete arrangement and the advantages of my invention will be readily apparent to those skilled in the art to which it appertains.

Having thus described my invention, what I claim is:

1. An attachment for seed planters, that comprises in combination with the seed box and the drive axle, of a planter, said box having a discharge; of a cylindrical casing having one end closed, a hopper mouth and an integral discharging leg, a dropping wheel, a shaft therefor that passes axially through the cylindrical casing, said dropper wheel being endwise shiftably mounted on the shaft and to rotate therewith, the wheel having peripheral pockets, the casing being so mounted with respect to the wheel that the space between it and the downgoing side of the wheel gradually reduces from the infeed to the discharge and a yieldable plunger mounted in said pockets.

2. The combination with the main axle, the seed box and the dropping wheel shaft journaled under the seed box and coupled with the main axle; of a series of casings each having a circular centrally disposed pocket, a cap plate for the pocket, said casings each having a hopper like infeed and a pendent leg discharge, of a hollow cup-shaped wheel mounted on the shaft, said wheel being endwise slidable on the shaft, a cap plate for holding the wheel in the casing, said wheel having a series of peripheral apertures, a plunger mounted in each aperture, spring pressed to extend up into said aperture.

3. A dropping means for planters that consists in combination with the main axle, the seed box, a shaft journaled under and lengthwise of the seed box, a series of circular shaped casings mounted on the drive shaft, said shaft being geared with the main shaft, the casing having one side open, a cover plate therefor, a dropping wheel endwise slidable, the wheel having radial apertures, a plunger operable in each aperture, means for keeping the plungers from projecting beyond the said front edge, and means for forcing the contents of the pockets therefrom when the wheel pockets pass over the discharge.

JACOB STREITZ.

Witnesses:
J. L. CARMAN,
MAUD BURR.